INVENTOR.
ROUEL R. CAMPBELL
BY Schapp & Hatch
ATTORNEYS

July 8, 1969 R. R. CAMPBELL 3,454,334
FILM TRANSPORT APPARATUS
Filed Nov. 18, 1965 Sheet 3 of 8

INVENTOR.
ROUEL R. CAMPBELL
BY Schapp & Hatch
ATTORNEYS

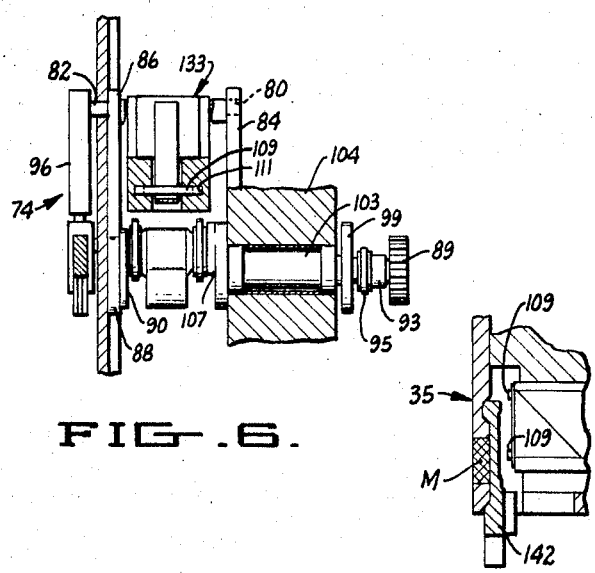
FIG. 6.
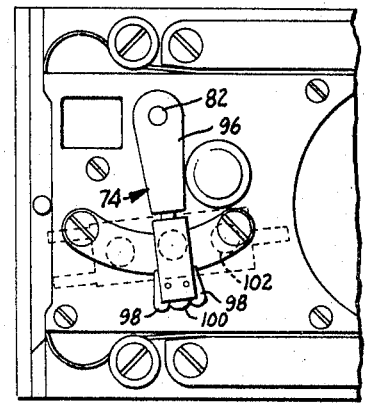
FIG. 7.
FIG. 8A.
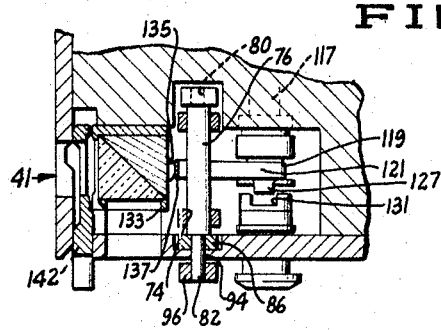
FIG. 8.
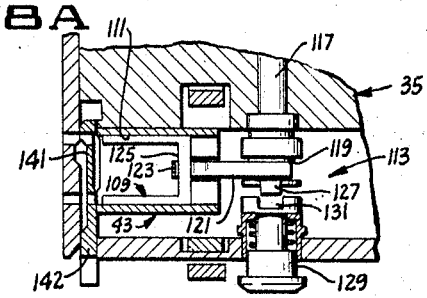
FIG. 9.
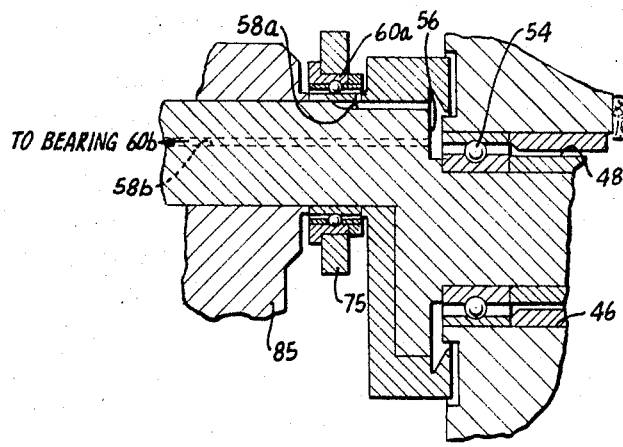
FIG. 10.
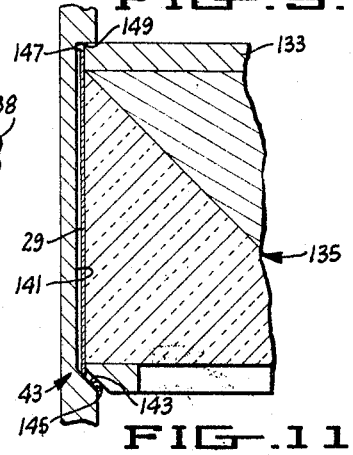
FIG. 11.
INVENTOR.
ROUEL R. CAMPBELL
BY
Schapp & Hatch
ATTORNEYS INVENTOR.
ROUEL R. CAMPBELL
BY Schapp & Hatch
ATTORNEYS

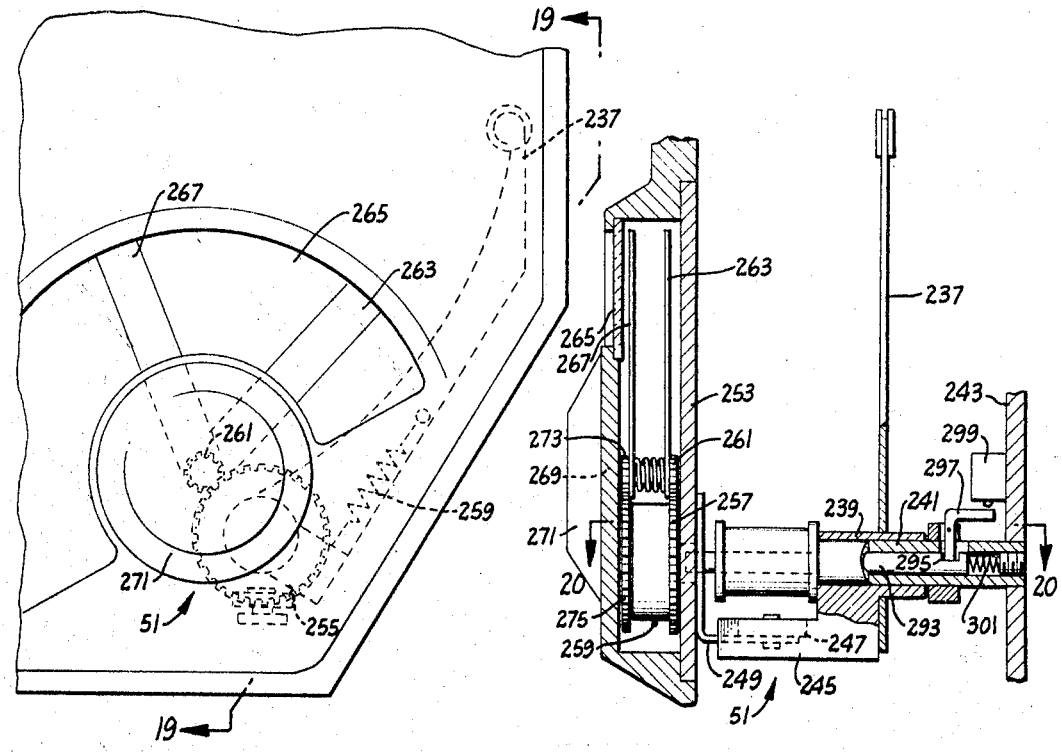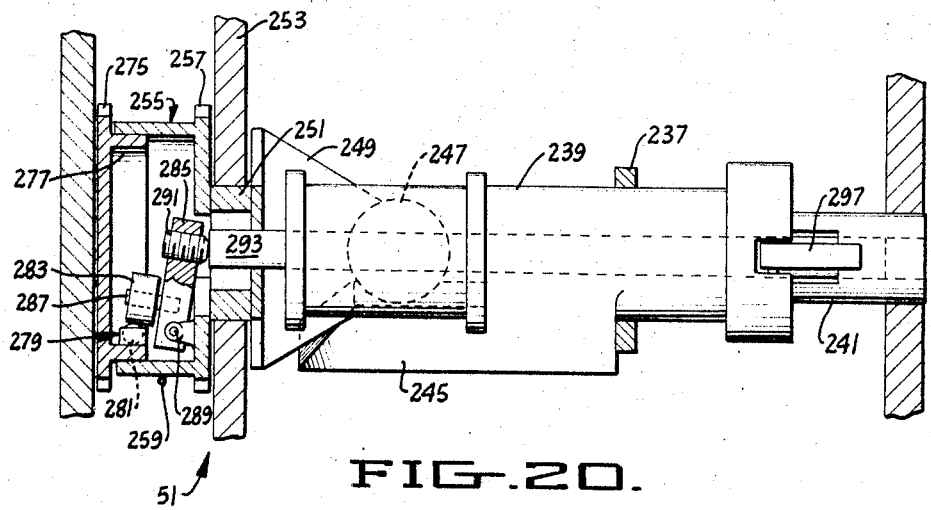

United States Patent Office 3,454,334
Patented July 8, 1969

3,454,334
FILM TRANSPORT APPARATUS
Rouel R. Campbell, 3410 Club Drive, Apt. 6,
Los Angeles, Calif. 90064
Filed Nov. 18, 1965, Ser. No. 508,465
Int. Cl. G03b 1/22
U.S. Cl. 352—191                                                18 Claims

ABSTRACT OF THE DISCLOSURE

A motion picture camera has a film advancing mechanism which includes a film advancing finger or claw carried on spaced cranks for movement in a circular path engaging the claw in the film sprocket holes and advancing the film intermittingly in a cyclic action. The throws of the claw supporting cranks are kept parallel to each other, and the claw is maintained in the same orientation, at all points along their circular paths by means of a link which connects the throws of secondary cranks in parallelism, the secondary cranks being mounted on the same crank shafts as the claw supporting cranks. The assembly is driven by a drive crank connected to the link. A register pin reciprocates axially to hold the film still when not engaged by the claw, and adjustment of the distance between the claw and register pin is accomplished by journalling the crank assembly so it can be tilted slightly relative to the register pin. This also provides an adjustment of the distance the film is moved with each cycle of the claw. Movement of the register pin into and out of engagement with the sprocket hole resiliently urges the pressure plate against and away from the film. An automatic lubricating system is provided, as are side-by-side positioning of the film supply and take-up spools, and a self-centering, variable opening shutter capable of being operated while the film advancing mechanism is in operation.

---

This application relates to Film Transport Apparatus, and more particularly to camera apparatus in which the film is intermittently advanced past an aperture one frame at a time at speeds ranging up to one thousand or more frames per second.

Heretofore, high speed motion picture cameras in which the film is advanced intermittently, one frame at a time, have been beset by many difficulties and problems. One of the major problems with such high speed intermittent motion picture cameras is the physical limitations of the various parts used, i.e., most of the assembled parts of such high speed cameras tend to fly apart at speeds in excess of a few hundred frames per second. This physical limitation has dictated the maximum number of frames which can be taken with a camera per second. In addition to the speed limitations imposed upon the assembled parts of these cameras, the mechanical intricacies of the construction of such cameras impose operational limitations. The parts must be synchronized in all respects so that the film is advanced exactly one frame at a time and is held against movement to permit a picture to be taken when the film is not being advanced. To start, stop and hold the film stationary while the film is exposed several hundred times a second involves exact synchronization which heretofore has been difficult to accomplish without making such cameras unduly expensive.

In cameras of the type described, a claw or finger is often employed to pull down the film one frame at a time, the claw or finger being driven rapidly to enter successively into a series of holes in the film for advancing the latter. The cameras heretofore known to the industry have employed complex gear trains for driving and synchronizing the operation of the film advancing claws or fingers. A very slight amount of wear on these gears creates backlash and runout problems which result in high shock loads, binding and failure of the bearings used for supporting the claws or fingers. The problems accompanying film transport mechanisms having gear drives are eliminated in the film transport apparatus of this invention by employing a crank member and link system wherein cranks connected to one link are offset or out of phase by substantially 90° from cranks connected to another link of the system, thereby preventing any over-center binding. This feature and an improved lubricating system substantially eliminate the binding problems of the gear driven film transport apparatus.

It is therefore a principal object of the present invention to provide a compact, fully synchronized and relatively inexpensive camera in which the film is intermittently advanced past an aperture one frame at a time at the rate of several hundred frames per second.

Another object of this invention is the provision of a high speed camera of the class described in which the film is securely held against movement between advancing movements so that clear unblurred pictures may be taken.

A further object of the present invention is the provision of a high speed camera such as described in which the distance the film is advanced upon each advancing operation may be adjusted to compensate for minute variations in the distance between sprocket holes in different strips or rolls of film.

A further object of this invention is the provision of a high speed camera which includes means for holding the film against longitudinal movement, and for holding the film against lateral movement and forward and rearward movement when the film is not being advanced, the aforesaid means being rendered inoperable when the film is advanced.

Still another object of the present invention is the provision of a high speed camera having a self-centering shutter in which the shutter opening can be conveniently varied during operation of the camera, i.e., a camera capable of a dissolved shutter action.

A further object of the present invention is the provision of a high speed motion picture camera having an automatic lubricating system for maintaining the various parts operated at very high speeds in a well-lubricated condition.

Another object of this invention is the provision of a high speed motion picture camera such as described in which the film supply spool and the film take-up spool are adapted to rotate about the same axis in side-by-side relation, thereby decreasing the size of the camera magazine.

Still another object of the present invention is the provision of a high speed motion picture camera in which the advancing mechanism is constructed in such a manner as to eliminate vibration and harmonic problems at very high operating speeds.

Further objects and advantages of the invention will be apparent as the specification progresses, and the new and useful features of the Film Transport Apparatus will be fully defined in the claims attached hereto.

In the accompanying drawings in which one of various possible embodiments of the invention is illustrated, FIGURE 1 is a side elevation of the camera with certain parts removed for clarity;

FIGURE 6 is a fragmentary section taken along line 6—6 of FIGURE 4;

FIGURE 7 is a side view of FIGURE 6 as viewed from the left side of the latter;

FIGURE 8 is an enlarged section taken along line 8—8 of FIGURE 5;

FIGURE 8A is a fragmentary view of FIGURE 8, showing certain parts in a moved position;

FIGURE 9 is an enlarged section taken along line 9—9 of FIGURE 5;

FIGURE 10 is an enlarged section taken along line 10—10 of FIGURE 4;

FIGURE 11 is an enlarged section taken along line 11—11 of FIGURE 5;

FIGURE 18 is an enlarged fragmentary view of FIGURE 1;

FIGURE 19 is a section taken along line 19—19 of FIGURE 18; and

FIGURE 20 is an enlarged section taken along line 20—20 of FIGURE 19.

Figure 1:
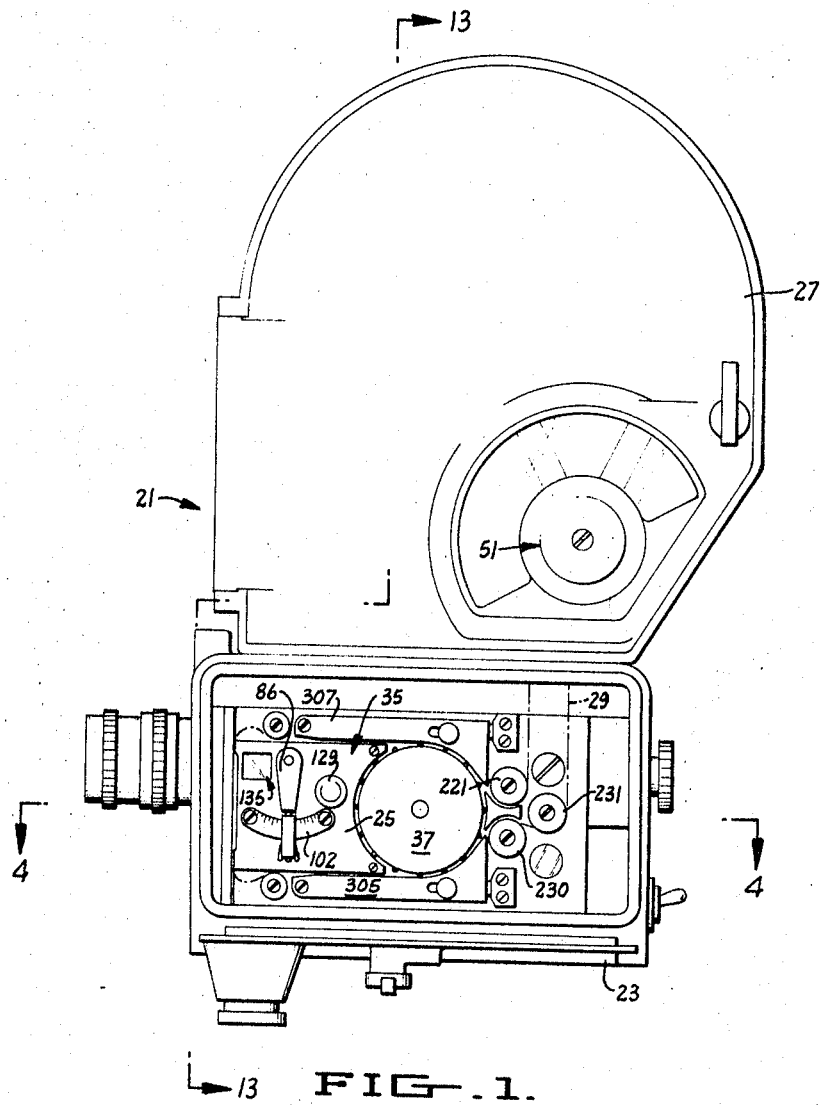
Figure 3:
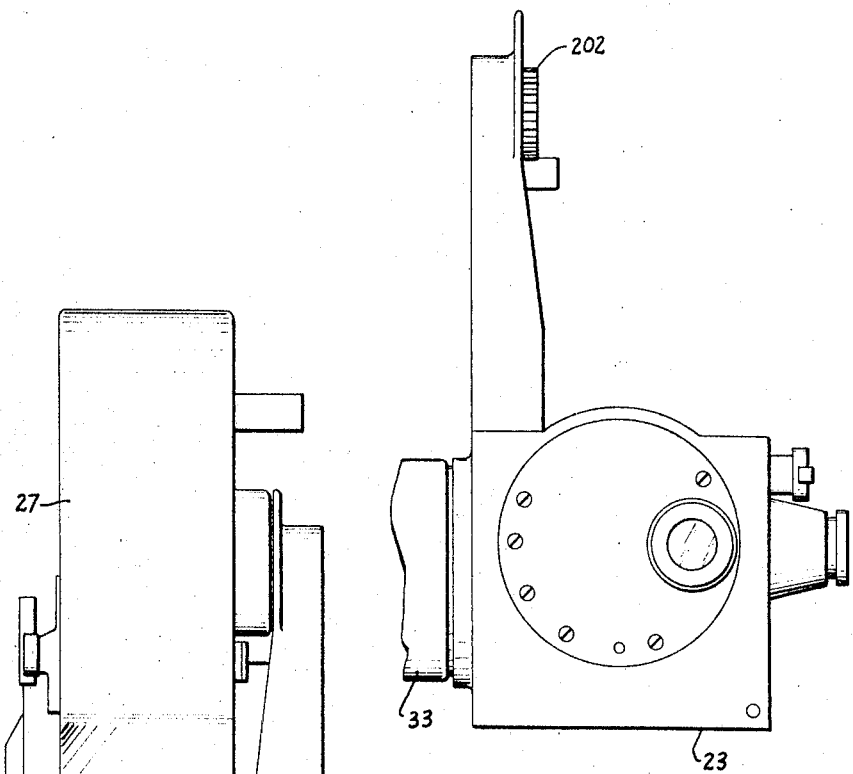
FIGURE 3 is a front view of the camera shown in FIGURE 1, certain parts being removed.
Figure 2:
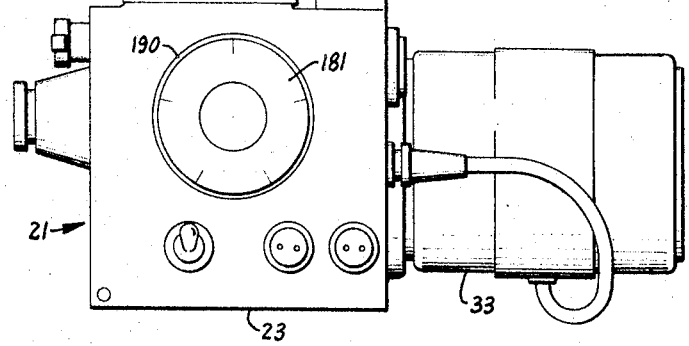
FIGURE 2 is a rear view of the camera shown in FIGURE 1.

Referring now to the drawings, a high speed motion picture camera constructed in accordance with this invention is generally indicated at 21 and includes a housing 23 containing a film control mechanism 25. Housing 23 has a spool carrying section 27 in which the film 29 is carried.

Power is supplied to the mechanism 25 and to a take-up spool 31 (see FIGURE 13) in section 27 by a motor 33 connected to housing 23. Mechanism 25 generally includes a sub-assembly 35 carrying a drive sprocket 37, film advancing means 39 (FIGURE 5) for intermittently advancing the strip of film 29 past an aperture 41, holding means 43 for holding the film 29 against forward or backward movement in a direction normal to the plane of the film 29 and for holding the film against lateral movement when the latter is not being advanced and registration pin means 45 for holding the film against longitudinal movement when the latter is not being advanced. A shutter mechanism 47 (FIGURE 14) is provided for exposing the film when the latter is held against movement.

The film 29 is fed through the control mechanism 25 from a supply spool 49 in housing section 27 and is returned to the take-up spool 31 in section 27. An event synchronizing means 51 (FIGURES 18–20) is connected to housing section 27 for providing a signal at a predetermined point during the film run. The signal may be used for effecting a changing condition at the object being photographed, or it may be used to start or stop movement, effect a change in illumination, or to provide some other happening which is desired to take place at a specified spot during a film run. The signal could, for instance, be used to fire a projectile when the camera has reached the desired framing speed. Other uses of the event synchronizer will be apparent to those skilled in the art.

Figure 4:
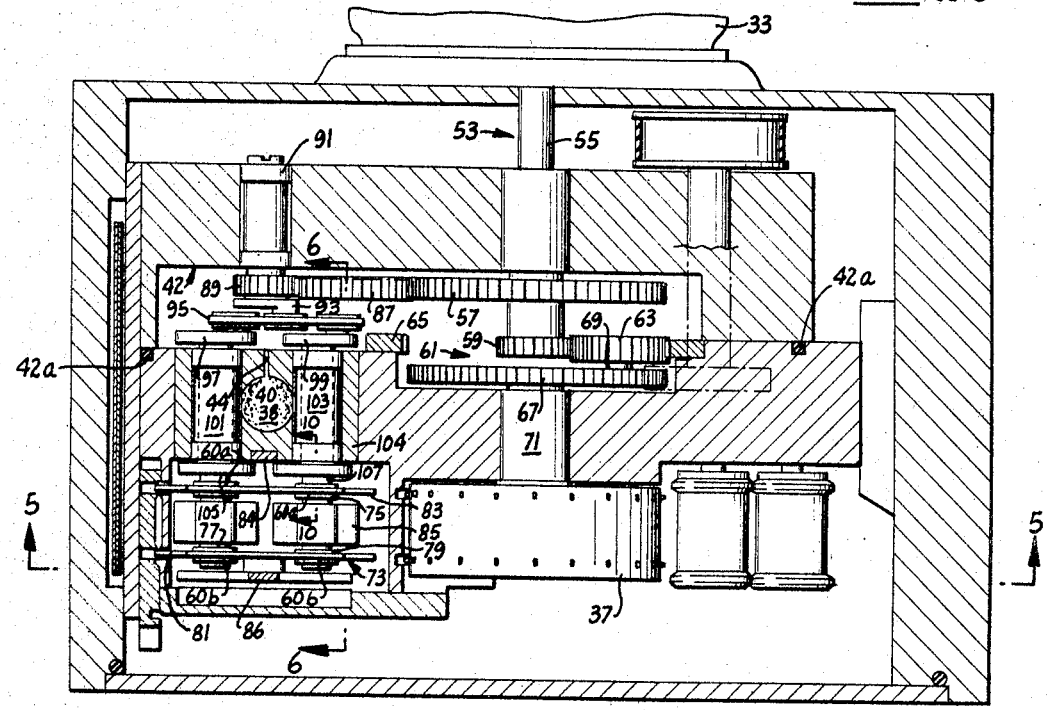
FIGURE 4 is an enlarged section taken along line 4—4 of FIGURE 1.
Figure 12:
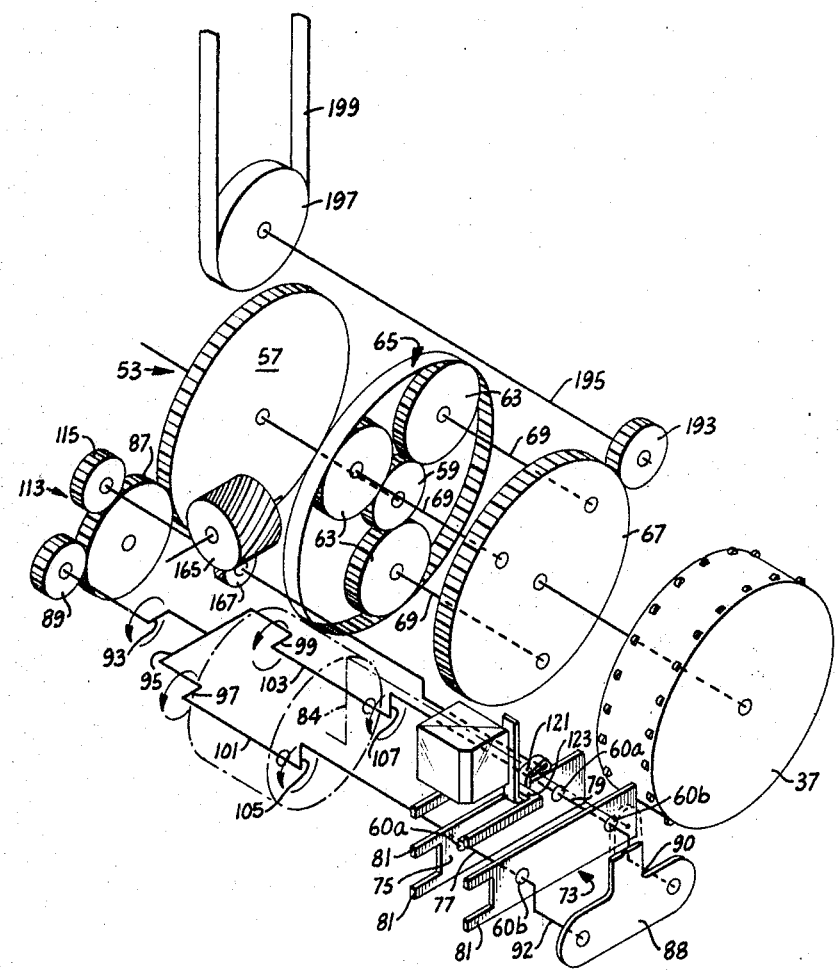
FIGURE 12 is a schematic layout of the drive trains of the apparatus.

Motor 33 is connected to sprocket 37 by a drive assembly 53 (FIGURES 4 and 12) which includes a shaft 55 journaled in housing 23 and sub-assembly frame 35 and carrying gears 57 and 59, the latter gear being part of a planetary gear system 61. Gear 59 drives gears 63 which travel around a stationary ring gear 65 connected to the frame 35. A gear 67 is connected by pins 69 to gears 63 and is connected to sprocket 37 by a shaft 71. When motor 33 is energized sprocket 37 is driven at a constant speed so that the film 29 is carried over the sprocket at a constant speed.

The film advancing means 39 for intermittently advancing the film 29 past aperture 41 includes a carrier 73 composed of two plates 75 spaced apart from one another by shafts 77 and 79. Each plate 75 has a pair of fingers 81 extending from the forward end thereof adapted to be inserted in adjacent holes along one side of the film. A rearwardly extending finger 83 is provided on each plate 75 for balancing the latter. Counterweights 85 are connected to shafts 77 and 79 between plates 75. The plates are adapted to be driven in a circular motion to cause the fingers 81 to enter into adjacent holes in the series of holes on opposite sides of the film and pull the latter down a predetermined distance before being withdrawn from the holes.

The drive for the carrier 73 is derived from motor 33 and includes a gear 87 in mesh with gear 57. Another gear 89 is carried on a shaft 91 which is journaled in sub-assembly frame 35. A crank 93 connects gear 89 with a link 95, the opposite ends of which are eccentrically connected by crank members 97 and 99 to a pair of shafts 101 and 103 rotatably mounted in a block 104 in frame 35. Shafts 101 and 103 are connected to carrier shafts 77 and 79 by cranks 105 and 107, which cranks extend at a 90° angle relative to the arms of cranks 97 and 99, i.e., the cranks 105 and 107 are 90° out of phase with respect to the rotation of cranks 97 and 99. As set forth previously, the provision of the substantially 90° offset between cranks 97, 99 and cranks 105, 107 prevents any binding of the drive mechanism, thereby eliminating binding as a cause of failure.

In order to insure that the fingers 81 will enter into the film at exactly the proper angular position, i.e., exactly into the holes at opposite sides of the film, the carrier 73 is made adjustable by an adjustment device 74. By means of device 74, carrier 73 can be tilted or cocked slightly (see FIGURE 7 for an exaggerated tilt) so that the angle of entry and exit and the points of entry into and exit from the holes in the side of the film may be moved slightly in a vertical direction. Also, tilting of the carrier 73 causes the stroke or advancing movement to be changed slightly so that adjustment of the advancing mechanism may be easily accomplished.

Figure 5:
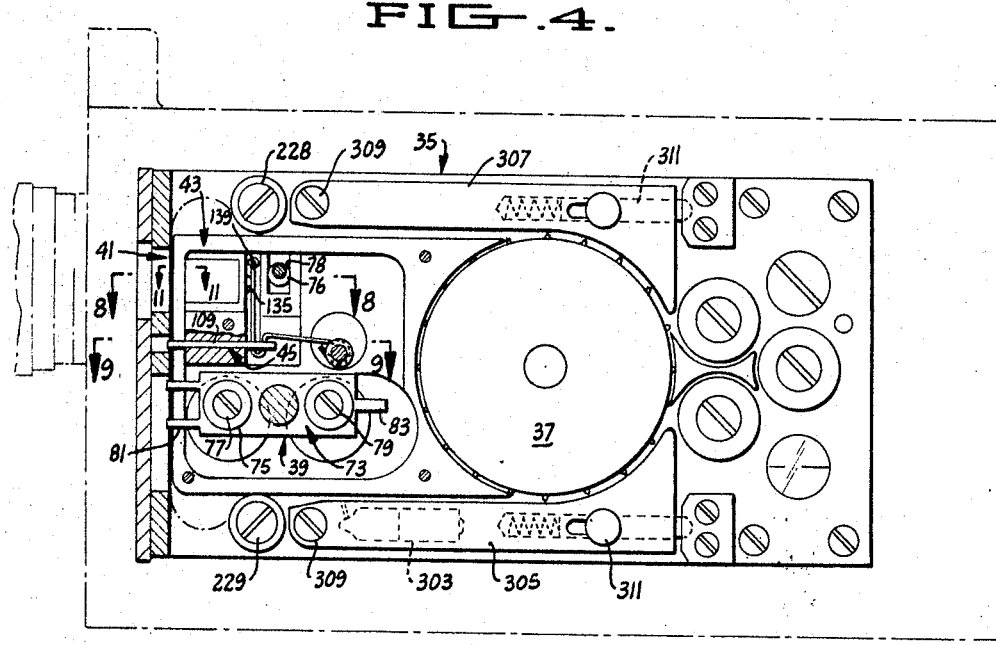
FIGURE 5 is a vertical section taken along line 5—5 of FIGURE 4.

The adjustment device 74 includes a shaft 76 journaled in a slot 78 in the frame 35 (see FIGURES 5 and 8). The opposite ends of shaft 76 are of reduced diameter and are eccentric on the shaft as indicated at 80 and 82. An arm 84 is journaled at one end on eccentric 80 and is connected at its other end to block 104 (see FIGURES 4 and 12). The eccentric portion 82 is journaled in an arm 86 of a plate 88 connected by cranks 90 and 92 to shafts 77 and 79. Eccentric portion 82 extends through an opening 94 in a side wall of assembly 35 and is connected to an adjusting arm 96. Arm 96 has a pair of grippers 98 attached to its lower end and biased apart by a spring 100. Grippers 98 engage an arcuate track 102 secured to assembly 35.

By pressing the lower ends of grippers 98 toward one another the grip on track 102 is released and arm 96 may be swung in the desired direction. As arm 96 is swung, shaft 76 is rotated in containing slot 78 and the eccentric end portions 80 and 82 swing slightly forward or backward of the FIGURE 5 position. This causes block 104, plate 88 and carrier 73 to tilt forward or backward a slight amount about an axis 106 (see FIGURE 12).

An automatic lubricating system 36 is provided for the various moving parts of advancing means 39. The system 36 includes a felt wick member 38 in a well 40 in block 104 (see FIGURE 4). Lubricant is supplied to wick 38 from the gear cavity 42, which cavity has a substantial amount of lubricant therein, along any convenient path, such as passage 44. Suitable seals are provided at 42a to prevent leakage of lubricant from cavity 42. The diameter of well 40 is such that the well intersects the passages 46 through which shafts 101 and 103 pass. As shown in FIGURE 10, a peripheral cavity 48 is provided to receive lubricant from wick 38.

Lubricant will flow from cavity 48 through the bearing 54 to an annular recess or slot 56 in the adjacent crank 105 or 107. Slots 56 are connected to slots 58a and 58b in each of the shafts 77 and 79 which support carrier 73 so that beraings 60a and 60b will be lubricated during operation of the camera. Inasmuch as lubricant is centrifugally forced into bearings 60a and 60b, a suction or vacuum effect is created in the slots 56, bearings 54, etc., so that a continuous minute flow of lubricant may be maintained to the bearings.

The registration pin means 45 for holding the film against longitudinal movement when the fingers 81 are not advancing the film is also adapted to be driven by motor 33. The registration pin means 45 includes a U-shaped pin 109, the outer ends of which are adapted to be inserted into two holes on opposite sides of the film (see FIGURES 5 and 9). The pin 109 rides on tracks or guides 111 formed in frame 35. The pin 109 is reciprocated toward and away from the film 29 by a registration pin drive system 113 which has a gear 115 driven by gear 87. One end of a shaft 117 journaled in frame 35 is connected to gear 115 and an eccentric drive pin portion 119 is provided on shaft 117 adjacent its other end.

A generally L-shaped spring 121 is connected to eccentric portion 119 and extends toward registration pin 109 where it is connected to the pin by a loop portion 123 extending around the cross member portion 125 of the pin. It will be seen that pin 109 is reciprocated toward and away from the film 29 by means of eccentric portion 119 and spring 121 when the gear 115 is driven by gear 87. A manual adjustment of the pin 109 is provided by a pair of tangs or projections 127 on the inner end of shaft 117, which projections rotate about the axis of rotation of the shaft 117. The projections are adapted to be engaged by a rotatable plunger 129 extending through the outer wall of frame 35.

By pushing plunger 129 inwardly from its FIGURE 8 position, the projections 127 are caught in slot 131 in plunger 129, and upon rotation of the plunger the shaft 117 is rotated, thus causing the eccentric portion 119, spring 121 and registration pin 109 to move toward or away from the film 29. depending upon the direction of rotation of the plunger.

Holding means 43 includes a cage 133 (FIGURES 5, 6, 8 and 11) mounted for sliding movement toward and away from the film 29. A prism 135 is mounted in pressure member or cage 133 to permit the image projected upon the film through aperture 41 to be observed from one side of the sub-assembly 35. A projection 135 (FIGURE 8) on the back of cage 133 is adapted to be engaged by the generally vertical portion 137 of L-shaped spring 121. The upper end of portion 137 is wrapped around a pin 139 connected to frame 35 so that the reciprocating motion imparted to the lower portion of spring 121 by eccentric 119 causes a slight reciprocatory motion to be imparted to the upper portion of the spring. This reciprocating motion causes the cage to be pushed toward the film 29 which is located in a guide or channel 141 (FIGURE 11) of an insert or pull-out plate 142 in the frame 35.

The plate 142 is adapted to be pulled from the position shown in FIGURE 8 to the position shown in FIGURE 8A to facilitate insertion of the film 29 in the camera. A magnet M in the frame 35 holds the plate 142 in its FIGURE 8A position while the film is inserted in the guide 141. The registration pin 109 is first advanced into the film path by actuating knob 129 as described above. The film is then dragged over the end of the ends of pin 109 until the latter engages the rectangular perforations or holes in the film. The function of pin 109 is to hold the film against longitudinal movement only, sidewise or lateral movement being prevented in a manner described below. Thus, it is only necessary that the ends of pin 109 engage the horizontal edges of the rectaugular perforations. The ends of the pin do not have to engage the vertical edges of the perforations, thereby eliminating a need for close tolerances on all surfaces of the pin during production of the latter.

One edge of cage 133 is beveled as indicated at 143 and is adapted to generally mate with a beveled portion 145 in channel 141. As the cage is moved toward the film under the impetus of spring 109, the film 29 is first caused to slide along beveled portion 145 of channel 141 until the edge 147 of the film engages and seats on the side 149 of channel 141. This prevents lateral movement of the film. Further forward movement of cage 133 under the impetus of spring 121 causes the cage to clamp the film firmly in guide 141 and thus prevents movement of the film in a direction generally perpendicular to the plane of the film.

Figure 13:
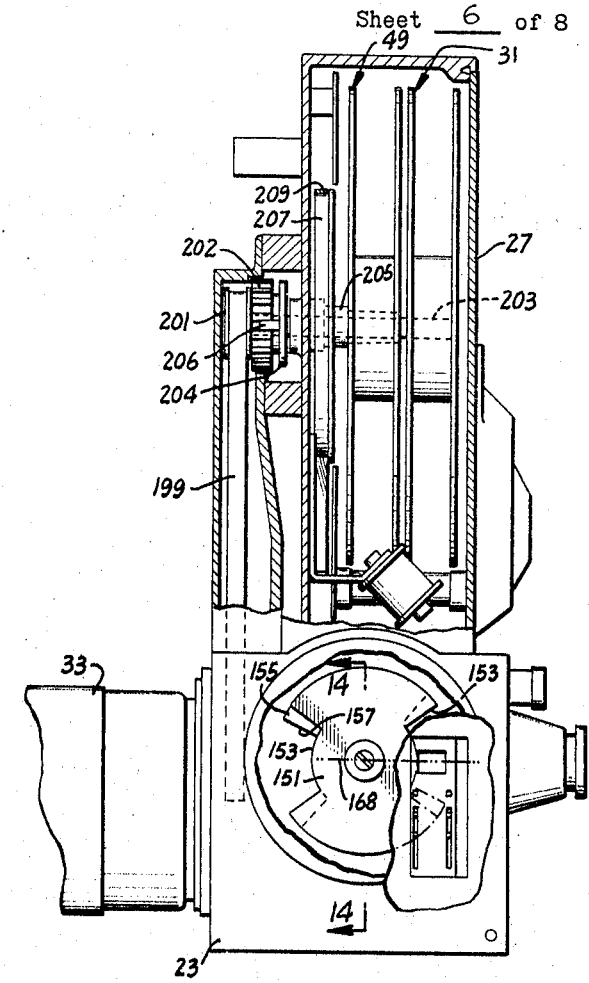
FIGURE 13 is a section taken along line 13—13 of FIGURE 1, certain parts being broken away for clarity.
Figure 15:
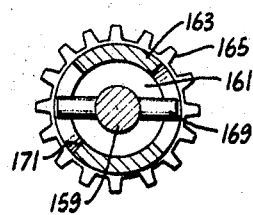
FIGURE 15 is an enlarged section taken along line 15—15 of FIGURE 14.
Figure 14:
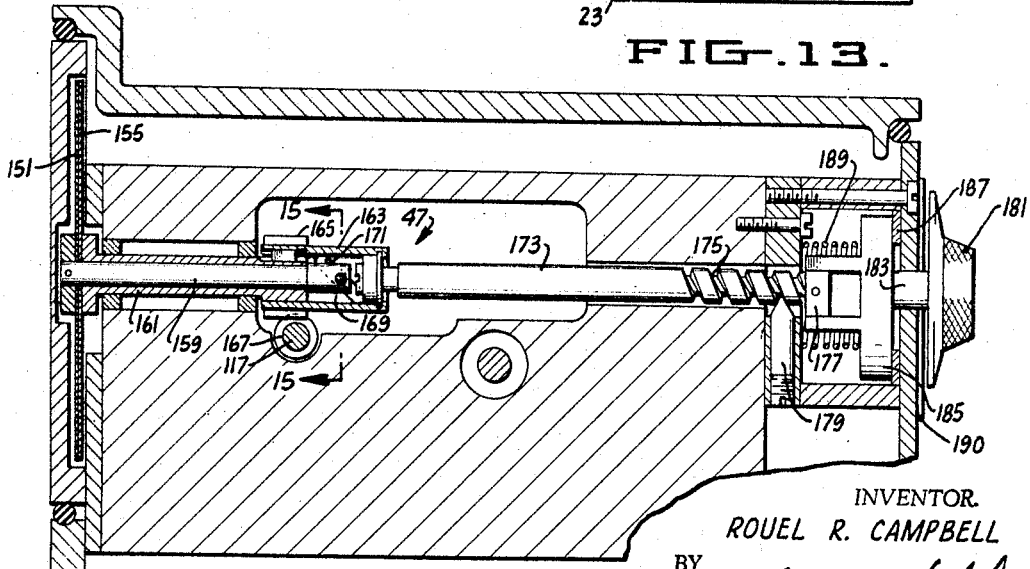
FIGURE 14 is an enlarged section taken on line 14—14 of FIGURE 13.

Shutter mechanism 47 is illustrated in FIGURES 13, 14 and 15 and includes a forward shutter plate 151 having removed portions 153 in the periphery thereof and a rearward shutter plate 155 having removed portions 157 in the periphery thereof. A shaft 159 is connected to the forward shutter 151 and extends rearwardly therefrom into the camera housing. A tubular shaft 161 is connected to rearward shutter 155 and extends rearwardly into the camera housing around shaft 159. The rearward end of shaft 161 is keyed to a sleeve 163 so that the shaft 161 rotates with the sleeve, but the sleeve is capable of axial movement relative to the shaft.

A helical gear 165 is secured to sleeve 163 and is driven by a gear 167 which is connected by a shaft 117 to gear 115. Shaft 159 is connected to rotate with shaft 161 by a pin 169 extending through slots 171 in the sleeve. The shutter plates 151 and 155 are rotated as a unit during operation of the camera so that the shutter openings, i.e., the spaces formed in the periphery of the combined shutter unit, are moved past the aperture 41.

The drive for the shutters is such that the shutter openings pass the aperture 41 exactly when the film 29 is held against movement. A center line 168 (FIGURE 13) of the shutter openings should, for proper exposure, be horizontally aligned with an imaginary horizontal line through the center of the aperture 41.

The size of the shutter openings may be varied without changing the horizontal alignment of the center line 168 and the imaginary horizontal line through the aperture by the apparatus described hereinafter. An actuating rod 173 is connected to sleeve 163 by a rotatable thrust bearing connection 175 adapted to longitudinally move the sleeve upon axial movement of the rod 173 while permitting relative rotation between the rod 173 and sleeve 163.

The rod 173 is helically grooved as indicated at 175 and has a projection 177 on its outer end. A finger 179 mounted in the camera housing extends into groove 175 so that rod 173 moves axially upon rotation. The means for rotating rod 173 includes an adjusting knob 181 connected to a shaft 183. A disc 185 is connected to shaft 183 and has a splined connection with projection 177. A spring 189 biases disc 185 outwardly against a brake lining 187 so that the knob 181 and shaft 173 are held in the rotational position selected by the person turning knob 181. The knob 181 rotates over a measuring dial 190 calibrated with respect to the lead of screw groove 175 so that rotation of the knob 181 over dial 190 will indicate the amount the shutter opening is being enlarged or diminished.

To reduce the size of the shutter opening a predetermined amount from the size shown in FIGURE 13, the rod 173 is moved axially first turning the knob 181 a predetermined amount as described above clockwise as viewed from the right side of FIGURE 14. This causes the rod 173 to rotate and move axially to the left, the axial movement forcing sleeve 163 to move axially. However, as sleeve 163 moves axially, two distinct movements occur. The sleeve is rotated a slight predetermined amount in a counterclockwise direction as viewed in FIGURE 15 due to the meshing engagement between gears 165 and 167. The counterclockwise movement of sleeve 163 would normally cause both shafts 159 and 161, and the shutters 151 and 155, to rotate an equal amount in the same direction. However, as sleeve 163 moves to the left as viewed in FIGURE 14, the pin 169 is engaged by the edge of slot 171, causing the shaft 159 and the forward shutter plate 151 to be rotated clockwise as viewed in FIGURE 15 by an amount equal to two times the movement of the combined shutter plate unit. Thus, while both shutter plates 151 and 155 are rotated clockwise as a unit a predetermined amount as viewed in FIGURE 13, the forward shutter plate 151 rotates counterclockwise by twice the predetermined amount. The end result of such movement is that the shutter openings are smaller with the center line of such openings passing through the imaginary horizontal center line of the aperture. Thus, the apparatus is still timed to present the shutter openings to the aperture 41 when the film is held against movement. It will be noted that the shutter opening may be adjusted in the above described manner while the shutter plates 151 and 155 are being rotated, i.e., the shutter is capable of performing a dissolving action. Moreover, this arrangement permits the exposure time to be controlled as the frame rate is changed.

The film guiding apparatus includes the supply spool 49 and take-up spool 31 in section 27. A gear 193 is driven by gear 67 and is connected by a shaft 195 to a pulley 197. A belt 199 is trained around pulley 197 and passes around another pulley 201 (FIGURE 13) having a star wheel 202 connected thereto. A plate 204 having a pin 206 thereon engageable with star wheel 202 is connected to a shaft 203. Take-up spool 31 is connected to the opposite end of shaft 203 so that the spool 31 is driven by belt 199 through pulley 201, star wheel coupling 202, 204 and 206, and shaft 203. Supply spool 49 is connected to a tubular shaft 205 which surrounds and is freely rotatable on shaft 203.

A brake drum 207 is also connected to tubular shaft 205 and rotates with supply spool 49. A brake band 209 (FIGURE 16) is trained around drum 207 and at one end 211 is connected to a stationary pin 213. The other end 215 of band 209 is connected to a bracket 217 pivoted about pin 213 and carrying a film roller 219. A spring (not shown) biases bracket 217 clockwise as viewed in FIGURE 16 around pin 213.

A plurality of rollers 221, 223, 225, 227, 228, 229, 230, 231, 232, 233 and 235 are rotatably mounted in the spool carrying section 27 and the camera housing 23 as shown in FIGURES 1, 4, 5, 16 and 17. Film passes from supply spool 49 over rollers 221 and 223, to and around roller 219 on bracket 217. The film is then trained around rollers 225, 232, 227, film sprocket 37, roller 228, film advancing means 39, rollers 229, 230, 231, 232 again, 233 and 235 to take-up spool 31.

Figure 16:
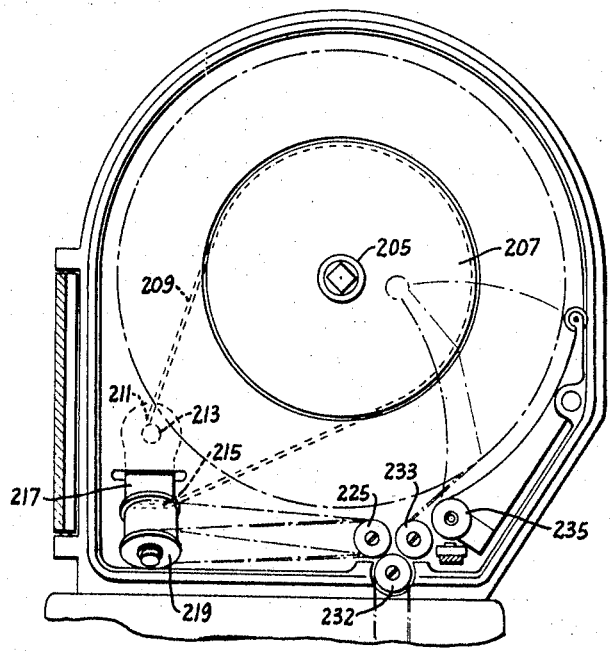
FIGURE 16 is a fragmentary view of FIGURE 1, certain parts being removed for clarity.
Figure 17:
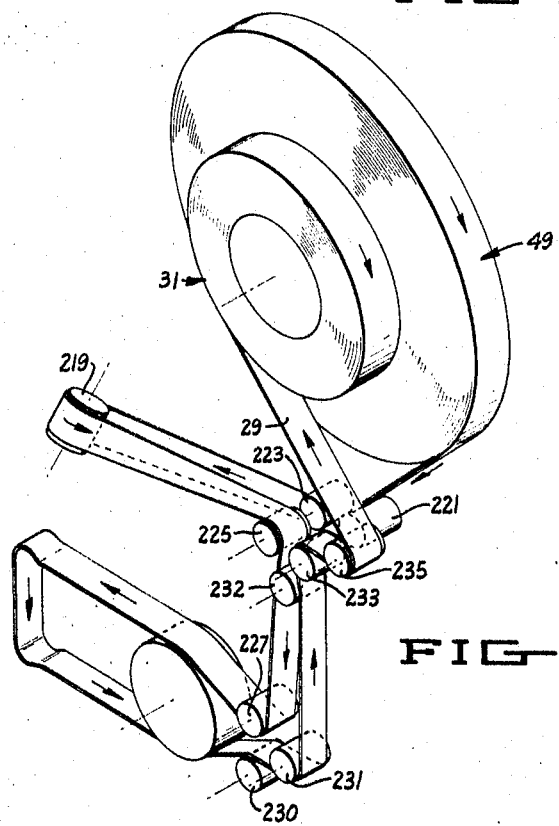
FIGURE 17 is a schematic view of the film path of the apparatus.

If the film should tend to become slack between supply spool 49 and sprocket 37 due to overrunning of the supply spool 49 the bracket 217 will be pivoted clockwise around pin 213 as viewed in FIGURE 16, thereby causing the brake band 209 to grip the drum 207 and slow down or stop the latter, and the supply spool 49 which is connected to the drum 207. As the film tightens up, the bracket 217 is pivoted counterclockwise as viewed in FIGURE 16 by the film passing around roller 219, thereby loosening the grip on the drum 207 by the brake band 209.

The event synchronizing means 51 is best illustrated in FIGURES 18–20 and includes a feeler arm 237 adapted to engage the film on the film supply spool 49. Arm 237 is connected to a housing 239 rotatable on a tubular projection 241 connected to a wall 243 of housing section 27.

Housing 239 has a portion 245 which is engaged by a roller 247 connected to a generally L-shaped arm 249. Arm 249 has a tubular sleeve 251 which extends through an opening in a plate 253 secured inside housing section 27.

Sleeve 251 is connected to a hub 255 having teeth 257 around its periphery. Hub 255 is biased counterclockwise as viewed in FIGURE 18 by a spring 259 so that roller 247 is maintained in engagement with portion 245. A gear 261 is in mesh with teeth 257 and has an indicating needle 263 connected thereto. The needle 263 overlies a footage chart and is visable through a window 265 in housing section 27. As the film on supply spool 49 is pulled therefrom the feeler 37 moves counterclockwise as viewed in FIGURE 18, causing housing 239, roller 247, arm 249, sleeve 251 and hub 255 to move in the same direction. This movement causes gear 261 and needle 263 to rotate clockwise as viewed in FIGURE 18, the needle 263 thereby indicating on the chart the number of feet of film that has been run through the camera.

The event synchronizing means 51 further includes an adjustable needle 267 connected to a shaft 269 journaled in a wall of housing section 27. A knob 271 is connected to shaft 269 on the outside of section 27. The knob is adapted to be manually rotated to set the needle 267 at the point during a film run at which it is desired to cause an event to occur, such as a projectile firing, for instance.

A gear 273 is connected to shaft 269 and meshes with a gear ring 275 on the periphery of a hub 277. The hub 30 is rotatable within hub 255 and the interior of the hub is circular except for a camming portion 279 formed by a pin 281 connected between two points of the inside periphery of the hub. When the knob 271 is rotated to set needle 267 in a desired position, the position of camming portion 279 is changed due to the rotation of hub 277 by gears 273 and 275. A roller 283 is adapted to engage the inside periphery of hub 277 and is connected to an arm 285 by a pin 287. Arm 285 is pivotally connected at 289 to the inside of hub 255 and rotates with the latter.

A screw 291 extends through the outer end of arm 285 and engages a plunger 293 extending through housing 239 and tubular projection 241. The outer end of plunger 293 is notched as indicated at 295 (FIGURE 19) and receives one end of a trip member 297. The other end of member 297 is adapted to engage a switch 299 which, when actuated, will signal the initiation of an event which is to take place. Plunger 293 is biased toward screw 291 by a spring 301 in tubular projection 241.

If it is desired to cause an event, such as the firing of a projectile, at a specified point during a film run the knob 271 is first turned to set needle 267 at the desired footage mark. This causes the hub 277 and camming portion 279 to be rotated to a particular position. As the film is removed from the supply spool 49 the feeler 237 moves counterclockwise as viewed in FIGURE 18, thereby rotating housing 239 and hub 255 (through the engaging relationship between roller 247 and portion 245 of housing 239). As hub 255 rotates, roller 283, which rotates with hub 255, rolls around the inside periphery of hub 277. As the footage needle 263 approaches event needle 267, roller 283 approaches camming portion 279.

When the needles are aligned, roller 283 rides on portion 279, thereby pivoting arm 285 to the position shown in FIGURE 20. As arm 285 pivots, the screw 291 forces plunger 293 to the right as viewed in FIGURE 20 against the bias of spring 301. As plunger 293 moves to the right, trip 297 rotates counterclockwise as viewed in FIGURE 19 and actuates switch 299. Switch 299 may be connected with the mechanism firing the projectile so that the projectile will be fired when switch 299 is actuated.

Even though the present camera is able to maintain good speed constancy over most of the film strip, it is very difficult to attain an exact film speed. In order to provide information as to the actual framing speed at any point on the film, it has become common practice to provide a timing light which flickers on and off a predetermined number of cycles per second and produces a series of images on the film. Measurement of the length and spacing of these images provides the desired information. The present camera incorporates a timing light 303 (see FIGURE 5), such as a neon lamp, mounted in a guide member 305. Pulses of light from the neon lamp are transmitted to the edge of the film strip 29 as it passes over guide 305. The guide 305, and a companion guide 307 above sprocket 37, are pivotally mounted in the frame 35 as indicated at 309, and held in position by spring biased latches 311.

The high speed motion picture camera apparatus of this invention operates in the following manner:

Let it be assumed that it is desirable to take high speed motion pictures of a sheet of shatterproof glass as the glass is struck by a high caliber bullet. Let it further be assumed that it is desirable to fire the bullet at the glass after 50 feet of film have been fed through the camera.

First, the switch 299 is connected to the mechanism adapted to fire the bullet so that actuation of the switch will actuate the firing mechanism. The knob 271 is then turned to place event needle 267 on the fifty foot mark on the chart under window 265. This causes camming portion 279 to be rotated with hub 277 a predetermined distance. The forward lens system on the camera may be adjusted to obtain the proper image on the film by sighting through the prism 135. The film advancing carrier 73 is adjusted to the position necessary to obtain a proper entry and exit angle of the fingers 81 in the holes at opposite sides of the film 29. As set forth above, this is accomplished by cocking the carrier 73 the necessary amount with the adjustment mechanism 74.

The proper shutter opening is determined in a conventional manner and the shutter adjusting knob 181 is turned to move the forward and rearward shutter plates 151 and 155, respectively, and the complete shutter plate unit, the proper amount to obtain the desired shutter opening with the latter being aligned with aperture 41.

When motor 33 is energized, the sprocket 37 begins to rotate to drive the film 29 through the film control mechanism 25. At the same time, the film control mechanism begins to operate. The carrier 73 is driven in a circular path by motor 33 through gears 87, 89, crank 93, line 95, crank members 97 and 99, shafts 101 and 103, and cranks 105 and 107. The fingers 81 on each plate 75 and 77 are first driven into adjacent holes in the sides of the film. The fingers 81 as they enter the film holes, are being driven forward and downward by the carrier 73 and begin to pull the film downward. The fingers 81 continue their downward motion, pulling the film with them as they descend. After the fingers pass the midway point in their downward movement they begin to withdraw from the film holes.

Just as the fingers 81 are withdrawn from the film holes, the registration pin 109 is being driven into a pair of holes in the film immediately above carrier 73 by spring 121, thereby preventing movement of the film 29 in a lengthwise direction. At the same time the cage 133 is moved toward the film under the impetus of the upper portion 137 of spring 121. As the cage is driven against the film 27 the latter slides along beveled portion 145 until the opposite edge 147 of the film is driven against the side 149 of channel 141 (see FIGURES 9 and 11). The film is thereby prevented from moving laterally. As the cage 133 seats in channel 141 the film is prevented from moving in a direction perpendicular to the plane of the film. Just as the cage 133 seats in the channel 141 one of the shutter openings passes in front of aperture 41 to expose the particular frame of film in front of cage 133. Immediately thereafter the spring 121 is beginning to withdraw registration pin 109 from the holes in film 29.

The upper portion 137 of spring 121 swings away from cage 133 and the pressure of the film thereagainst moves the cage to the right as viewed in FIGURE 11. Just as registration pin 109 is fully withdrawn from the holes in film 29 the pins 81 on carrier 73 are entering new holes in the film and begin to advance the latter. This advancing, holding and exposing process is repeated several hundred times each second.

After fifty feet of film have been removed from supply spool 49, the feeder 237 has rotated housing 239 and hub 255 far enough to cause roller 283 to ride up onto camming portion 279, thereby forcing plunger 293 to the right as viewed in FIGURE 20 a sufficient distance to cause trip 297 to actuate switch 299. As described above, actuation of switch 299 causes the firing mechanism to fire the bullet toward the glass. As the bullet approaches and hits the glass the camera continues to operate to obtain individually framed pictures of the impact and the result thereof.

It will be seen that the high speed motion picture camera of this invention efficiently and effectively intermittently advances film past an aperture one frame at a time at the rate of several hundred frames per second. Between each advancement, the film is held firmly against any movement so that a clear unblurred picture may be taken. All of the moving parts are fully synchronized so that snagging or tearing of the film will not occur even though several operations are repeated hundreds of times each second.

As various changes could be made in the above constructions without departing from the scope of the invention, it is intended that all matter contained in the above description or shown in the accompanying drawings shall be interpreted as illustrative and not in a limiting sense.

I claim:

1. Apparatus for advancing a strip of film having a series of holes therein, comprising a carrier, a film engaging finger connected to said carrier, means for moving said carrier in a circular motion in a plane substantially perpendicular to said film to move said finger into one of said holes, advance the film a predetermined distance, and remove said finger from said one hole, said finger being moved into and out of said hole at substantially the same angle relative to the strip of film, and means for adjusting the distance through which the film is advanced by said finger; said means comprising an arm connected to said carrier, a shaft, an eccentric portion on said shaft connected to said arm, and means for rotating said shaft to swing said eccentric portion, said arm being rotated by the eccentric portion as the latter is swung, said carrier being tilted by said arm upon rotation of the latter, tilting of said carrier causing the distance said finger advances the film to be varied.

2. Apparatus for advancing a strip of film having a series of holes therein along one edge thereof comprising a carrier, a pair of film engaging fingers connected to said carrier and spaced apart by a distance approximately equal to the distance between adjacent holes in said series of holes, and means for moving said carrier in a circular motion to cause said fingers to be inserted into adjacent holes, advance the film, and be removed from said holes, said fingers having the same angular relationship with said film upon insertion therein as they do upon withdrawal therefrom, and means for adjusting the angle at which the fingers are moved into and removed from the holes in the film, said means for adjusting the angle at which the fingers are moved into and removed from the holes in the film includes an arm connected to said carrier, a shaft, an eccentric portion on said shaft connected to said arm, and means for rotating said shaft to swing said eccentric portion, said arm being rotated by the eccentric portion as the latter is swung, said carrier being tilted by said arm upon rotation of the latter, tilting of said carrier causing the distance said finger advances the film to be varied.

3. Apparatus for advancing a strip of film having a series of holes therein along each side edge thereof, comprising two pairs of film engaging fingers connected to each other, said pairs of fingers being spaced apart by a distance approximately equal to the distance between the series of holes on the other side of the film, the fingers of each pair being spaced apart by a distance approximately equal to the distance between successive holes in each series, each pair of fingers being located in the same plane as a respective series of holes, and means for moving said fingers in a circular motion around axes which are generally parallel to the film adjacent the carrier, the fingers, during each revolution of circular motion moving into holes in the film, advancing the film, and moving out of the holes, said means comprising a carrier having two plates spaced apart from one another, said fingers extending from one end of the plates, a first pair of shafts connecting said plates together, and drive means connected to said shafts for imparting circular motion to said plates, said drive means including a second pair of shafts, a first set of cranks connecting said first pair of shafts to one end of said second pair of shafts, a second set of cranks connected to the other end of said second pair of shafts, a link connecting said second set of cranks, and means for driving said link in a circular motion.

4. Apparatus as set forth in claim 3 wherein said first and second pairs of shafts have axially extending passages therein, and each of said first set of cranks has a groove therein connecting the axially extending passages in the shafts to which the crank is connected, and means for supplying lubricant to said passages in said second shafts, the lubricant flowing through the passages in said second shafts to the grooves in said first set of cranks, and through the groves in said first set of cranks to the passages in said first set of shafts, said plates having bearings therein through which said first set of shafts pass, said bearings being lubricated by the lubricant in the passages in said first set of shafts.

5. Apparatus as set forth in claim 3 further including lubricating means comprising a receptacle for holding a supply of lubricant, said first and second shafts and said first set of cranks having interconnected passages therein, said passages in said second shafts being in communication with said receptacle.

6. Apparatus as forth in claim 3, further comprising means for adjusting the angular relationship between the fingers and the film.

7. High speed motion picture apparatus comprising a housing, a sprocket in said housing, means driving said sprocket at a substantially constant speed, a film exposing station adjacent said sprocket, said sprocket being adapted to feed a strip of film through said station, said station including first means for intermittently advancing the film, second means for intermittently holding the film against lengthwise movement, third means for intermittently holding the film against movement in a direction normal to the film, said second and third means being connected together for simultaneous operation between advancing operations of said first means, said first means including a carrier having a plurality of film engaging fingers extending towards holes in the film, means driving said carrier in a circular motion in a plane substantially perpendicular to the film, said fingers being moved into said holes, advancing the film a predetermined distance, and being withdrawn from the holes, said fingers being maintained in a predetermined angular relationship with the film at all times, the apparatus further including means for adjusting the angular relationship between said fingers and the film.

8. Apparatus as set forth in claim 7 wherein said second means comprises a U-shaped registration member the outer ends of which are adapted to enter into the holes in the film, a rotating shaft, said shaft having an eccentric pin connected thereto, a spring connecting said eccentric pin to said registration member, whereby each complete revolution of said rotating shaft causes the outer ends of said registration member to move into and then out of two holes in the film.

9. Apparatus as set forth in claim 7 wherein said third means includes a channel-shaped guide for guiding the film through the film exposing station, a pressure member slidable toward and away from said guide, a rotating shaft, said shaft having an eccentric pin connected thereto, a spring connected at one end to said housing, said spring upon each complete revolution of said rotating shaft, being adapted to engage and move said pressure member against the film to hold the latter against the channel-shaped guide.

10. Apparatus for exposing a strip of film having a series of holes therein comprising an aperture, a forward shutter, a rearward shutter adjacent and behind said forward shutter, each of said shutters having a portion thereof removed from its periphery, the peripheral margin portions of said shutters being located in front of said aperture, a first shaft connected to and extending rearwardly from said forward shutter, a tubular shaft connected to and extending rearwardly from said rearward shutter, said tubular shaft being concentric with and surrounding said first shaft, and means for rotating said shafts at the same speed, a strip of film having a series of holes therein along one edge thereof, film engaging fingers, and means for moving said finger into one of said holes, moving said finger in a direction to advance the film, and moving said finger out of said one hole, said finger being moved into and out of said one hole at substantially the same angle relative to the film, said finger movement causing the film to be advanced a predetermined distance, a registration pin adapted to move toward and away from the film and for preventing lengthwise movement of the film, said registration pin being located in the same plane as the series of holes, eccentric driving means for the registration pin for moving the latter into one of the holes between film advancing movements for preventing lengthwise movement of the film, a holding member on one side of the film having a guide channel through which the film passes, a pressure member on the other side of the film having edge portions adapted for movement toward and away from opposite edges of the film, said driving means being adapted to move said pressure member toward the film to clamp the latter against said holding member in said channel, said means for moving said film advancing finger and said means for rotating said shafts at the same speed being connected so said driving means for synchronous operation therebetween.

11. Apparatus for actuating a switch after a predetermined length of film has passed through a motion picture camera of the type having a housing and a film spool therein, comprising a feeler adapted to engage film on said spool, a first rotatable member operatively connected with said feeler and adapted to be rotated by movement of the latter, a second rotatable member adjacent said first member, said second member having an actuating portion thereon, means for rotatably adjusting the position of said second member, and switch actuating means connected to said first member and adapted to rotate therewith, said switch actuating means being adapted to actuate said switch when said first member rotates said switch actuating means into contact wtih said actuating portion.

12. High speed motion picture camera apparatus comprising a housing, a film spool for carrying film, a sprocket in said housing, means driving said sprocket at a substantially constant speed, a film exposing station adjacent said sprocket, said sprocket being adapted to feed a strip of film through said station, said station including first means for intermittently advancing the film, second means for intermittently holding the film against lengthwise movement, third means for intermittently holding the film against movement in a direction normal to the film, said second and third means being connected together for simultaneous operation between advancing operation of said first means, a feeler adapted to engage film on said spool, a first rotatable member operatively connected with said feeler and adapted to be rotated by movement of the latter, a second rotatable member adjacent said first member, said second member having an actuating portion thereon, means for rotatably adjusting the position of said second member, and switch actuating means connected to said first member and adapted to rotate therewith, said switch actuating means being adapted to actuate said switch when said first member rotates said switch actuating means into contact with said actuating portion.

13. Apparatus for advancing a strip of film having sprocket holes along its length, comprising a film engaging finger formed for selective engagement in the sprocket holes, spaced cranks of equal throw connected to said finger and formed for moving the latter in a circular path to effect said selective engagement of said finger with the sprocket holes and move the film strip a desired increment during each such engagement, drive means for rotating said cranks, and a plate associated with said finger and connected to said cranks and formed for maintaining the throws of said cranks in parallelism as they rotate whereby said finger is oriented parallel to itself at all positions around said circular path, said cranks being mounted on spaced crank shafts, each of said crank shafts having a secondary crank, said secondary cranks are of equal throw, and a link connecting said secondary cranks to maintain their throws in parallelism as they rotate, and wherein the throws of said secondary cranks are at an angle from direct alignment to the throws of said spaced cranks so as to avoid a dead center alignment.

14. Apparatus for advancing a strip of film as described in claim 13 and wherein said angle is substantially 90 degrees.

15. Apparatus for advancing a strip of film as described in claim 14 wherein said drive means for rotating said cranks comprises rotary crank means connected to said link and formed for driving the latter in a circular path.

16. Apparatus for advancing a strip of film having sprocket holes along its length, comprising a film engaging finger formed for selective engagement in the sprocket holes, spaced cranks of equal throw connected to said finger and formed for moving the latter in a circular path to effect said selective engagement of said finger with the sprocket holes and move the film strip a desired increment during each such engagement, drive means for rotating said cranks, a link connected to said cranks and formed for maintaining the throws of said cranks in parallelism as they rotate whereby said finger is oriented parallel to itself at all positions around said circular path, and an axially reciprocable register pin selectively engageable with the sprocket holes for holding the film strip against movement when said finger is not engaged in the sprocket holes, and wherein adjusting means is provided for selectively varying the distance between said register pin and the circular path of said finger for accommodating different spacings of sprocket holes in the film strip.

17. Apparatus for advancing a strip of film as described in claim 16 and wherein said adjusting means comprises mechanism for effecting a tilting of said finger relative to said register pin.

18. Apparatus for advancing a strip of film as described in claim 17 and wherein said tilting is accomplished by carrying said cranks on an element mounted for rotation with respect to said register pin and the film strip.

References Cited

UNITED STATES PATENTS

| | | | |
|---|---|---|---|
| 1,177,137 | 3/1916 | Rector | 226—65 |
| 1,388,886 | 8/1921 | Pittman | 226—64 |
| 1,784,515 | 12/1930 | Fairall | 226—69 |
| 1,966,683 | 7/1934 | Pollock | 352—225 |
| 2,149,218 | 2/1939 | Heinisch | 352—230 |
| 2,218,763 | 10/1940 | Mery | 352—192 |
| 2,372,405 | 3/1945 | Tondreau | 352—192 |
| 2,481,115 | 9/1949 | Heurtier | 226—64 |
| 2,953,965 | 9/1960 | Stiffler | 352—166 |
| 3,303,271 | 2/1967 | Hecker | 352—218 |

FOREIGN PATENTS 697,977   11/1930   France.

MORTON ANSHER, *Primary Examiner.*

MONROE H. HAYES, *Assistant Examiner.*

U.S. Cl. X.R.

352—175, 218